(12) United States Patent
Thompson et al.

(10) Patent No.: US 8,273,978 B2
(45) Date of Patent: Sep. 25, 2012

(54) SOLAR PANEL ARRAY SUN TRACKING SYSTEM

(75) Inventors: Daniel S. Thompson, San Rafael, CA (US); Monty Mullins, Rohnert Park, CA (US); Craig Stager, San Rafael, CA (US); Anthony Zante, Fremont, CA (US)

(73) Assignee: Thompson Technology Industries, Inc., Novato, CA (US)

( * ) Notice: Subject to any disclaimer, the term of this patent is extended or adjusted under 35 U.S.C. 154(b) by 583 days.

(21) Appl. No.: 12/088,121

(22) PCT Filed: Sep. 28, 2006

(86) PCT No.: PCT/US2006/038185
§ 371 (c)(1),
(2), (4) Date: Mar. 26, 2008

(87) PCT Pub. No.: WO2007/038760
PCT Pub. Date: Apr. 5, 2007

(65) Prior Publication Data
US 2008/0251115 A1    Oct. 16, 2008

(51) Int. Cl.
*H02N 6/00* (2006.01)
*H01L 31/042* (2006.01)

(52) U.S. Cl. ................................................ 136/244

(58) Field of Classification Search ............... 136/251, 136/244
See application file for complete search history.

(56) References Cited

U.S. PATENT DOCUMENTS

| | | | | |
|---|---|---|---|---|
| 4,328,789 A * | 5/1982 | Nelson | ................ | 126/579 |
| 4,429,178 A * | 1/1984 | Prideaux et al. | ........... | 136/246 |
| 5,125,608 A * | 6/1992 | McMaster et al. | ........ | 248/163.1 |
| 6,058,930 A * | 5/2000 | Shingleton | ................ | 126/600 |
| 6,123,067 A * | 9/2000 | Warrick | ................ | 126/593 |
| 2002/0112443 A1* | 8/2002 | Shipman et al. | ......... | 52/745.13 |
| 2006/0260672 A1* | 11/2006 | Niederer | ................ | 136/251 |

FOREIGN PATENT DOCUMENTS

WO      WO2004090327      * 10/2004

* cited by examiner

*Primary Examiner* — Basia Ridley
*Assistant Examiner* — Tamir Ayad
(74) *Attorney, Agent, or Firm* — Craig M. Stainbrook; Stainbrook & Stainbrook, LLP

(57) ABSTRACT

A solar panel tracking system that can simultaneously rotate large arrays of solar panels position in multiple rows utilizing a single drive system. The drive system comprises a single actuation device that drives multiple rotational translation stages at each solar array row for tilting the panels to the correct position. A dual beam structure within each row insure appropriate panel support during rotation and provide the framework for simplified installation and maintenance.

15 Claims, 7 Drawing Sheets

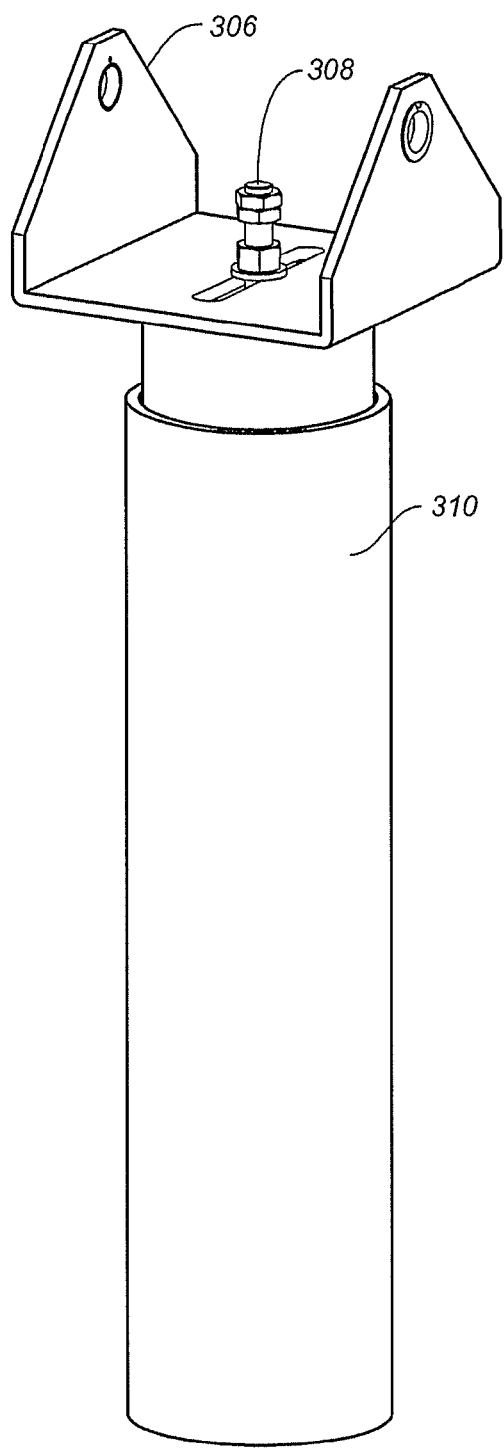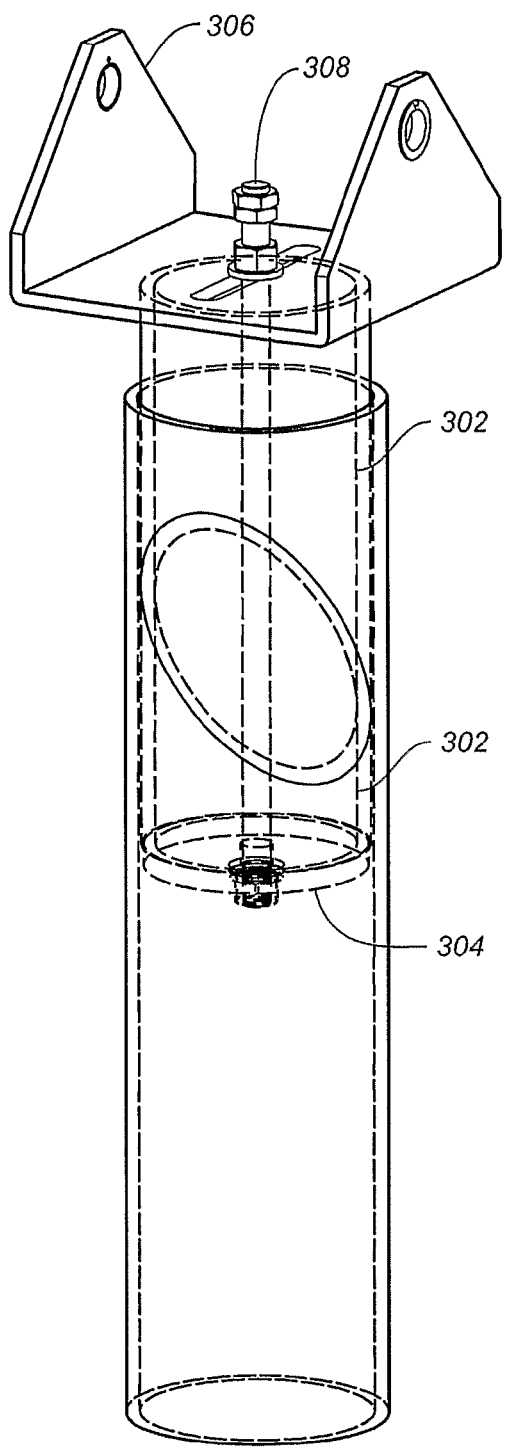
*FIG. 6A*  *FIG. 6B*

SOLAR PANEL ARRAY SUN TRACKING SYSTEM

BACKGROUND OF THE INVENTION

1. Technical Field

This invention relates generally to the collection of solar energy for conversion into electrical energy, and more specifically to the arrangement of solar panel drive and tilt mechanisms to follow the movement of the sun relative to the earth. Still more specifically, the present invention relates to a drive mechanism for rotating a large array of solar panels in a cost effective manner.

2. Background Art

For years drive mechanisms have been employed to rotate and align solar panel arrays. However, most of the drive mechanisms in the prior art have not been designed to use a single drive unit to move large arrays with multiple rows of panels. Extremely large multi-megawatt solar power stations are now being planned and built, so the need for efficiently driving large arrays has become an important and necessary part of the solar power system.

In general, solar photovoltaic panels for large scale energy production comprise a collection of photovoltaic cells configured in rectangular patterns. A number of panels are typically mounted level with one another on top of support structures with minimal spacing between panels. This economizes on space and maximizes solar collection efficiency.

Further, solar panel arrays are typically mounted to optimize the sunlight striking their surfaces during daylight hours. In order to further improve solar collection efficiency, drive mechanisms have been employed to keep the panel surfaces in a perpendicular (normal) orientation relative to the direction of travel of the sun's rays.

There are a number of prior art drive systems designed to track the sun with a solar panel array. These drive mechanisms generally tilt the solar panel arrays by moving the structures upon which the panels are mounted. Both horizontal and vertically driven systems have been utilized for this purpose. Although numerous panel movement mechanisms have been employed, they are generally ill-suited for using a single drive system to rotate large arrays (i.e., those having 1000 or more panels). Accordingly, the installation and commissioning of large solar panel array tracking systems using such drive mechanisms have been complicated and therefore costly.

A number of patents show tilt mechanisms for the movement of multiple panel arrays. Notable examples include:

U.S. Pat. No. 4,429,178 to Pridaux et al (1984), which shows a plurality of closely spaced solar panels mounted in pairs on opposite sides of a number of horizontally extending, co-linear torque tubes supported for rotation about their respective co-linear axes by a number of support posts. A drive assembly on one of the support posts is connected to a pair of torque tubes for simultaneously rotating these and the other torque tubes in a solar tracking mode.

U.S. Pat. No. 5,228,924 to Barker et al (1993), discloses a mechanical solar module support structure for pivotally more than one photovoltaic panels in a planar array. The system uses a single mechanism to simultaneously change the angle of declination of the array by the same amount. The system includes at least two side-by-side coplanar panels, a pivot shaft extending transversely of the side-by-side panels, at least two supports spaced apart lengthwise of the shaft, mounting apparatus for mounting the pivot shaft to the supports, connectors for connecting the panels to the pivot shaft so that the panels can pivot about the longitudinal axis of the shaft, a mechanical coupling linking the panels together to form a unified flat array, and a drive motor for mechanically pivoting the unified array about the axis and for locking the array against pivotal movement when the motor is off.

The systems shown in each of the '924 and the patents depend on a single spine to pivot and support the solar panels. This necessitates additional structural cross-members to provide adequate support for the panel arrays due to gravity and to withstand high winds. The additional cross-members increase the spacing or height of the panels above the pivot axis. Consequently, the side forces on the panels due to wind loading create substantial torsional forces that must be withstood by the rotational drive mechanism, and this leads to a need for much higher drive forces.

U.S. Pat. No. 6,058,930, to Shingleton, teaches a drive mechanism for rotating solar arrays using a single torque tube. The disadvantage of this approach is that the torque tube and the bearings at the support posts must be quite large to transmit the torque. The '930 patent also teaches driving multiple rows of panels simultaneously utilizing a single ram drive mechanism. The problem with this approach is that the ram force required to drive a large number of panels creates a substantial side force at the ram base. This creates the need for substantial anchoring or large pedestals to withstand the large side load produced by the ram.

Another liability of prior art drive systems is that they create challenges for field installations. For instance, using the prior art systems, vertical adjustments of the arrays have been difficult and limited. This problem is most prevalent for arrays mounted in a soil environment where the main means of support is typically driven pilings. Because of the variations in piling heights it is necessary to provide vertical positioning and holding devices to adjust the solar panel arrays to the required height. This is a time consuming and expensive process. Screw adjustment mechanisms may be used. However, they are generally expensive for the large diameters needed for posts which supporting multiple panels.

In summary, the prior art drive mechanisms for rotating and tilting solar panels configured in a large array having multiple rows all suffer from a number of disadvantages, including: (a) the need to use expensive support structures for the large array; (b) deficiencies in adequately addressing the effect of wind on the forces required for array rotation; (c) deficiencies in addressing how to withstand large side loads generated by multiple row arrays; (d) expense; and (e) the need to use drive methods with large, exposed moving parts that can create hazards to personnel and equipment nearby.

The foregoing patents and other prior art devices reflect the current state of the art of which the present inventors are aware. Reference to, and discussion of, these patents is intended to aid in discharging Applicants' acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

DISCLOSURE OF INVENTION

The present invention is a new and improved solar power tracking system for optimally aligning a plurality of electricity generating solar panels comprising a solar panel array.

A first and principal object of the present invention is to provide a simple method for moving a large array of solar panels.

Another object of the present invention is to simplify the construction and installation of a solar tracking system.

A still further object of the present invention is improve operating efficiency and facilitate maintenance.

Yet another object is to provide a solar tracking system adaptable for use with large array systems requiring efficient means for assembly and installation.

A still further object is to provide a solar tracking system for mounting on a pre-constructed array of pilings.

Another object is to provide a solar tracking system that eliminates the large side loads typically produced by ram driven systems for large arrays.

Still another object is to provide a solar tracking system that rotates large arrays cost effectively and with much less force required than existing systems.

Another object is to provide a solar tracking system that can be field adjusted with minimal effort.

A still further object is to provide a safer solar tracking system where the drive mechanism movement is restrained to a straight line confined horizontal axis.

The solar tracking system of the present invention includes a method and apparatus for rotational movement of a solar panel array to optimally align for capturing and utilizing solar energy.

In a first aspect of the inventive solar tracking system, there is provided an apparatus including at least one row of solar collectors (photovoltaic cell panels) positioned along a north-south axis. The panel array can be rotated about a north-south axis causing the solar array to rotate east and west following the sun's then current rotation pattern. The solar panel array is mounted on a frame structure of two or more main beams that are used both for support and for rotating the panel array in its tracking pattern. Rotational force from a drive system is transferred to this two beam structure only, simultaneously lifting one side of the panels and lowering the other side, and thereby causing the structure to pivot about an axis. This axis is defined at one end by the rotation actuator, through a series of pivot pins located at each vertical support post, and terminates at the end of the array row at the last vertical support. This two beam structure is constructed so that the faces of the solar panels are positioned close to the pivot axis. This minimizes twisting moments caused by wind forces. The support posts are positioned upon, or are made part of, the piling structure, and are spaced in intervals of up to 17 feet or more. The two beam structure has sufficient stiffness to span the distance between post supports to support the weight of the solar array panels and related equipment and also provide for the transmission of rotational force to the array without the twist displacement generally associated with a single torsional transfer device.

In another aspect, the present invention is seen to comprise a method in which torsional movement is transferred to each row of a solar panel array. The entire solar array may consist of any number of rows, each of which is simultaneously rotated by its respective actuation mechanism consisting of a drive arm rotating about the solar array pivot axis. The drive arm for each row is pushed or pulled by a linear actuator in the form of a ram drive screw or pressurized cylinder. Although the linear actuation to each drive arm may be separately applied, it is more likely ganged by means of a series of ram shaft extensions traversing the length of the rows. Each axially joined extension traverses a horizontal axis guided by means of a roller bearing connected to the ram shaft with a pin. The drive arms translate the linear motion into rotational displacement pivoting about the panel rotation axis through another roller bearing attached to the ram shaft pin, thereby pushing on the free end of the drive arm and causing it to rotate.

Alternatively, rotational force may be imparted to each drive arm in the form of a rotational drive device such as a gear motor. In such an instance, rotational motion is transferred to the drive arm by a cable or chain drive element in either a parallel or series configuration.

In yet another aspect, the present invention is seen to include a method by which a solar panel array ram support structure is vertically adjusted to correct heights. A pair of cylinders having an angular cut between them acts as an offset positioning tool. The offset tool is inserted into the piling or support post and is vertically adjusted such that the panels and pivot point are at the correct height. Once the angular cut cylinders are cinched together with a clamping bolt, the offset tool will withstand vertical forces exceeding 2000 pounds or more without vertical slippage in the post or piling.

There has thus been broadly outlined the more important features of the invention in order that the detailed description that follows may be better understood, and in order that the present contribution to the art may be better appreciated. Additional objects, advantages and novel features of the invention will be set forth in part in the description as follows, and in part will become apparent to those skilled in the art upon examination of the following. Furthermore, such objects, advantages and features may be learned by practice of the invention, or may be realized and attained by means of the instrumentalities and combinations particularly pointed out in the appended claims.

Still other objects and advantages of the present invention will become readily apparent to those skilled in this art from the following detailed description, which shows and describes only the preferred embodiments of the invention, simply by way of illustration of the best mode now contemplated of carrying out the invention. As will be realized, the invention is capable of modification in various obvious respects without departing from the invention. Accordingly, the drawings and description of the preferred embodiment are to be regarded as illustrative in nature, and not as restrictive.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 6*a* and 6*b* illustrate the vertical positioning device used at each support post for the solar array and for the ram structural support.

REFERENCE NUMBER LEGEND

FIGS. 1-2

Figure 3:
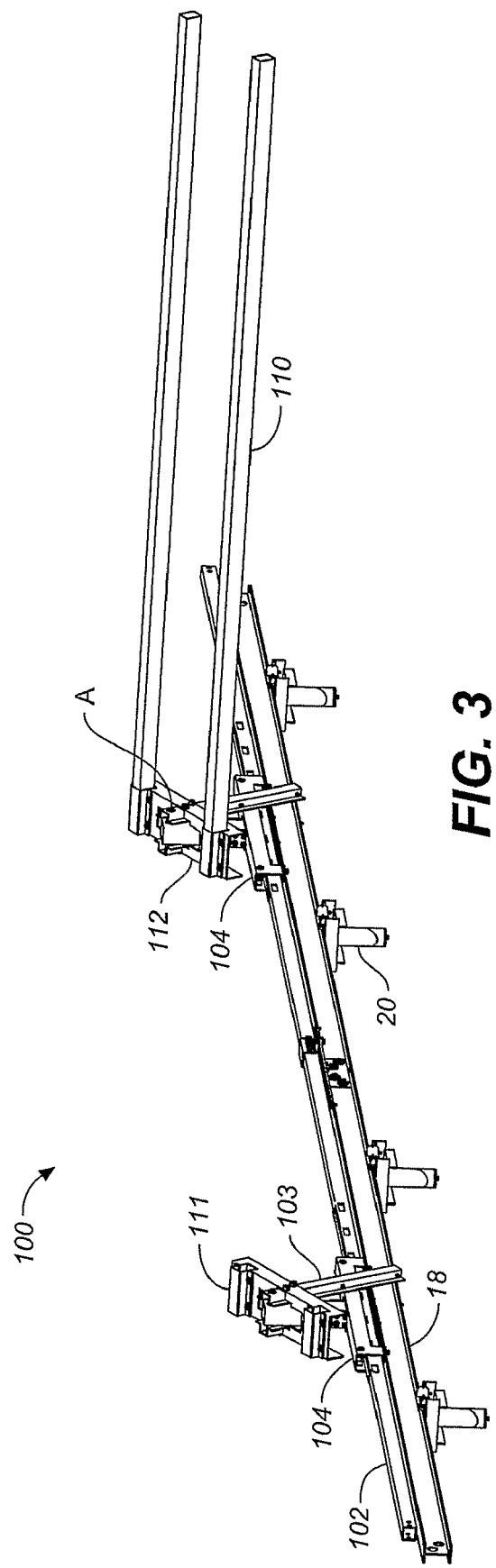
FIGS. 3 and 4 illustrate how the linear force from the actuator is transformed into rotational force at each row.
Figure 4:
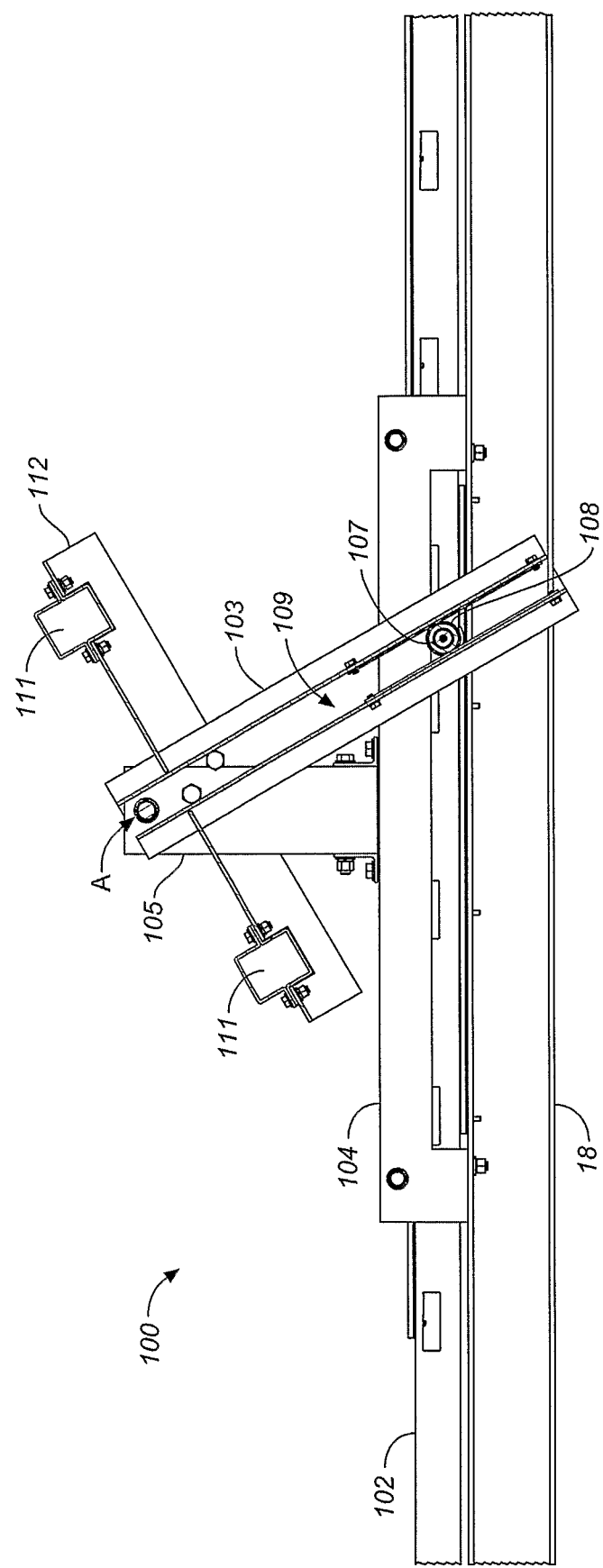
Figure 5:
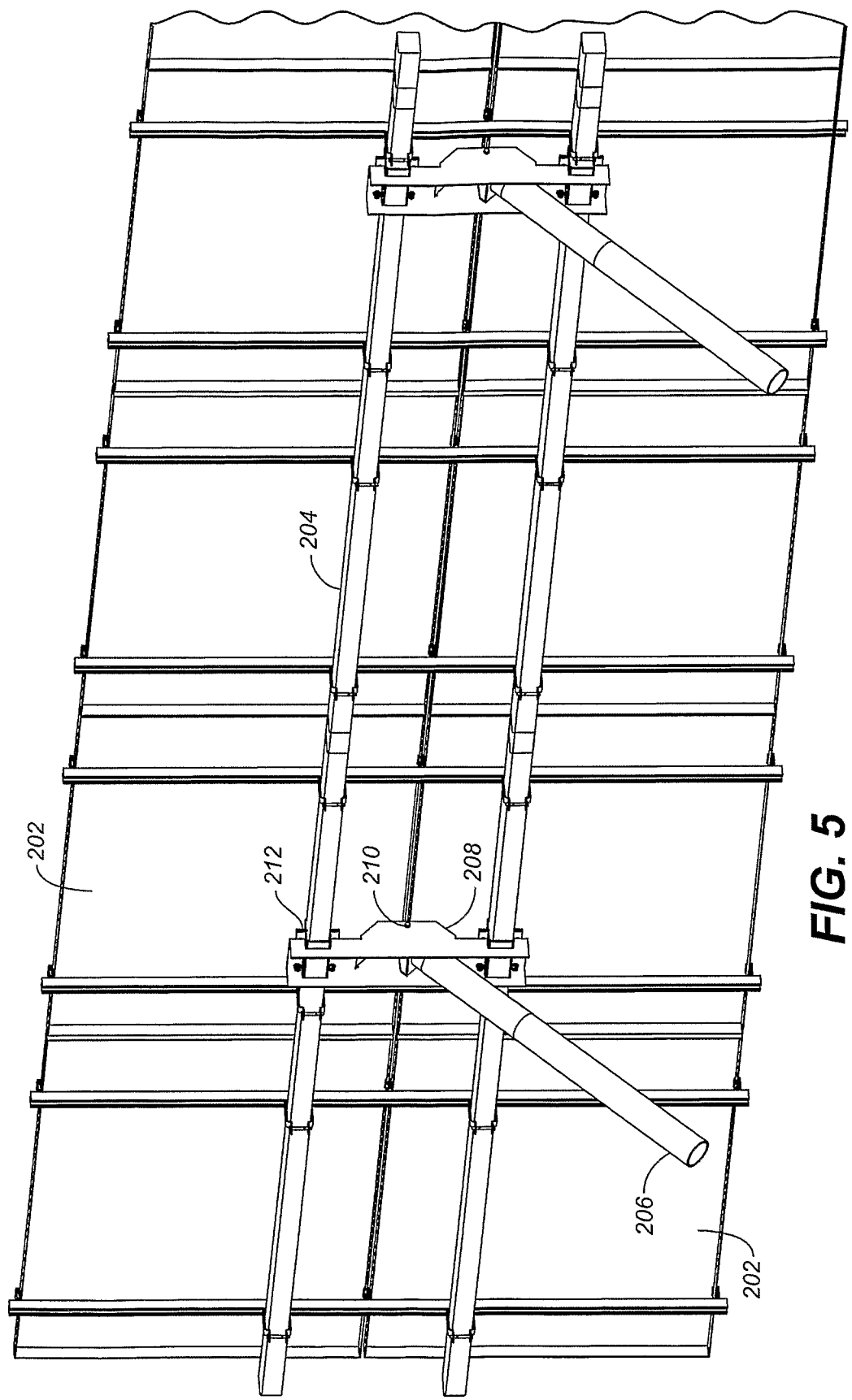
FIG. 5 shows the underside of the solar array for a typical row and illustrates how the two bar structure pivots the array on the support posts.
Figure 7A:
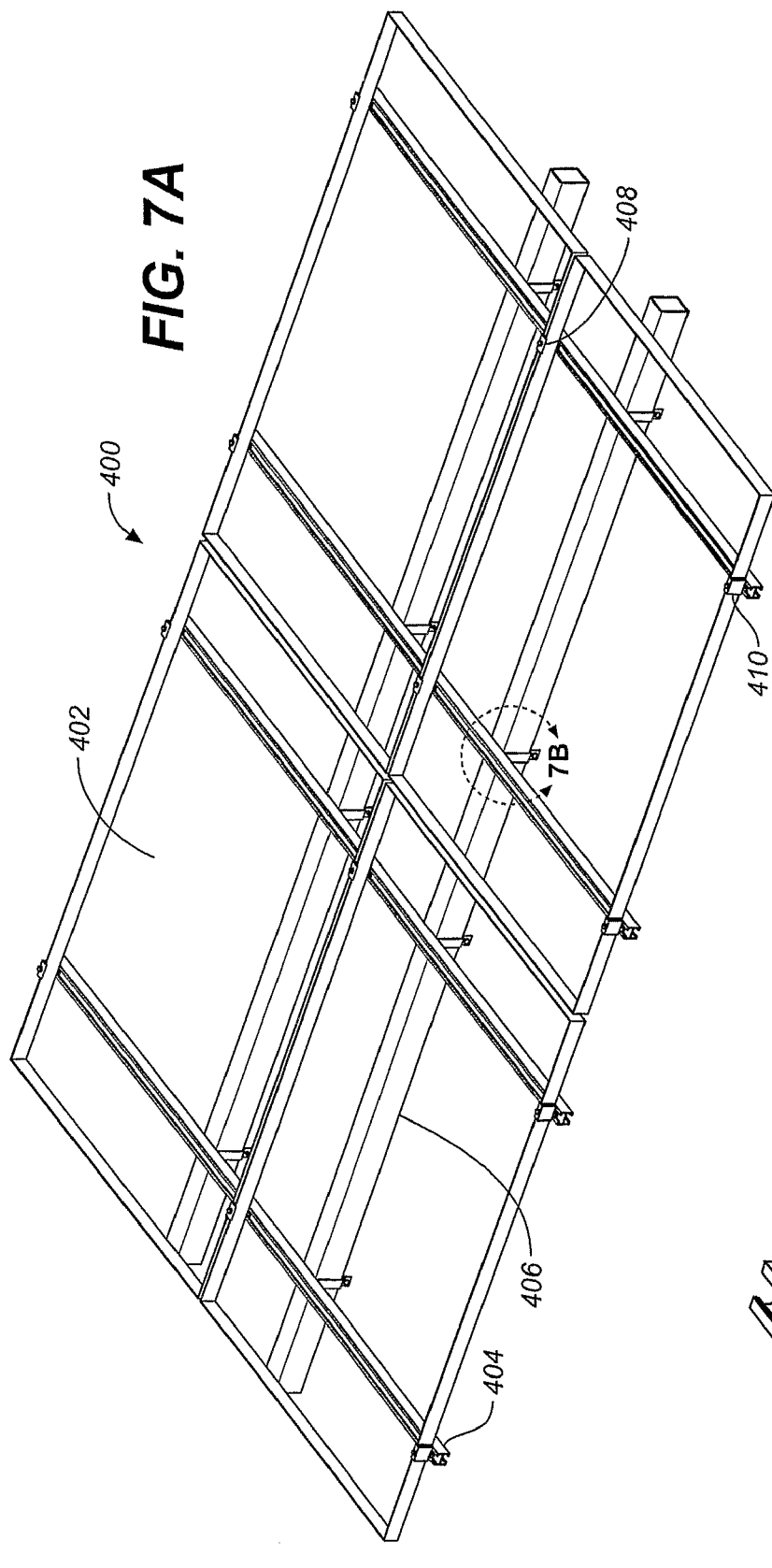
FIGS. 7A and 7B show the apparatus with which the solar panels are attached to the support rails.
Figure 7B:
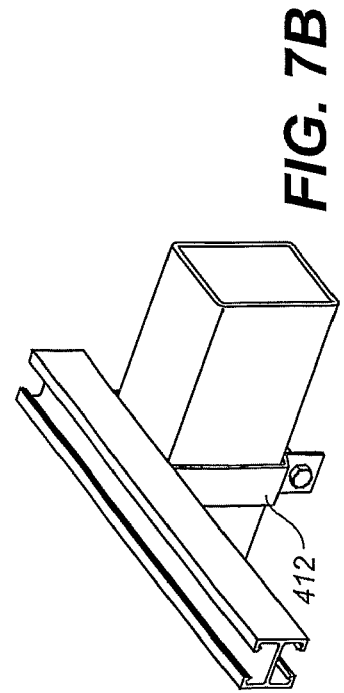

2 solar panel array 4 solar panels
6 support structure
A axis of rotation for each panel
8 drive system
9 support posts
10 drive system
12 motorized ram
14 ram supports
16 support base
18 ram support beams
20 piling (or post)
22 clamps
24 dual-sided drive shafts
26 reciprocating drive tube
FIGS. 3-4
100 rotational drive system
102 drive shafts
103 drive arm
104 pivot support post platform
105 pivot support post
107 drive pin
108 roller bearing
109 drive arm channel
110 panel mounting rails
111 tubular clamps
112 mounting rail support bracket
FIG. 5
200 lateral mounting structure
202 side-by-side panels
204 panel mounting rails
206 support posts
208 support cradle
210 pivot pin
212 splice clamps
FIGS. 6A-6B
300 vertical adjustment mechanism
302 tube pair
304 angular seam and a cinch plate
306 pivot bracket
308 threaded rod
310 support post tube
FIGS. 7A-7B
400 solar panel pair
402 solar panels (discrete)
404 cross rails
406 panel mounting rail
408 T clips
410 end clips
412 anchor clamps

BEST MODE FOR CARRYING OUT THE INVENTION

Figure 1:
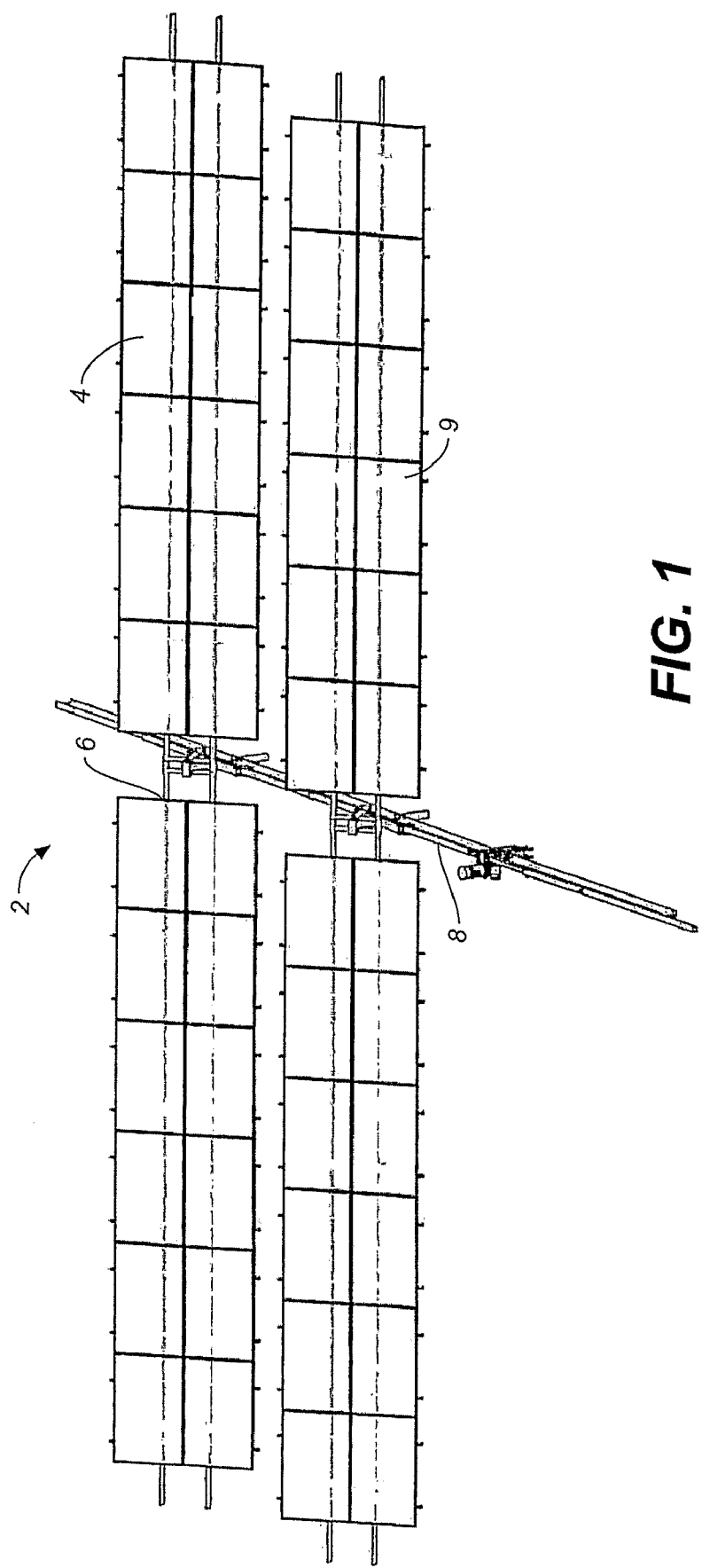
FIG. 1 is a drawing of the solar panel tracking system showing a representative two rows of an array and the drive system associated with the two rows.

Referring to FIGS. 1 through 7B, there is illustrated a new and improved solar power sun tracking system. FIG. 1 shows a first preferred embodiment of the solar tracking system of the present invention. The solar panel array 2 generally includes one or more rows of solar panels 4 mounted on a rotatable support structure 6 positioned with a rotation axis A for each panel oriented north and south. The drive system 8 is positioned on an east west axis perpendicular to the rotation axes of the solar panels in the array rows.

The solar panels in the array are disposed in the same pattern on each side of the of the drive system. This array pattern is repeated for additional rows north and south of the initial row. A series of support posts 9, which in general consists of vertical pilings driven into the ground and related connection hardware are typically used for the support of the array 2.

Figure 2:
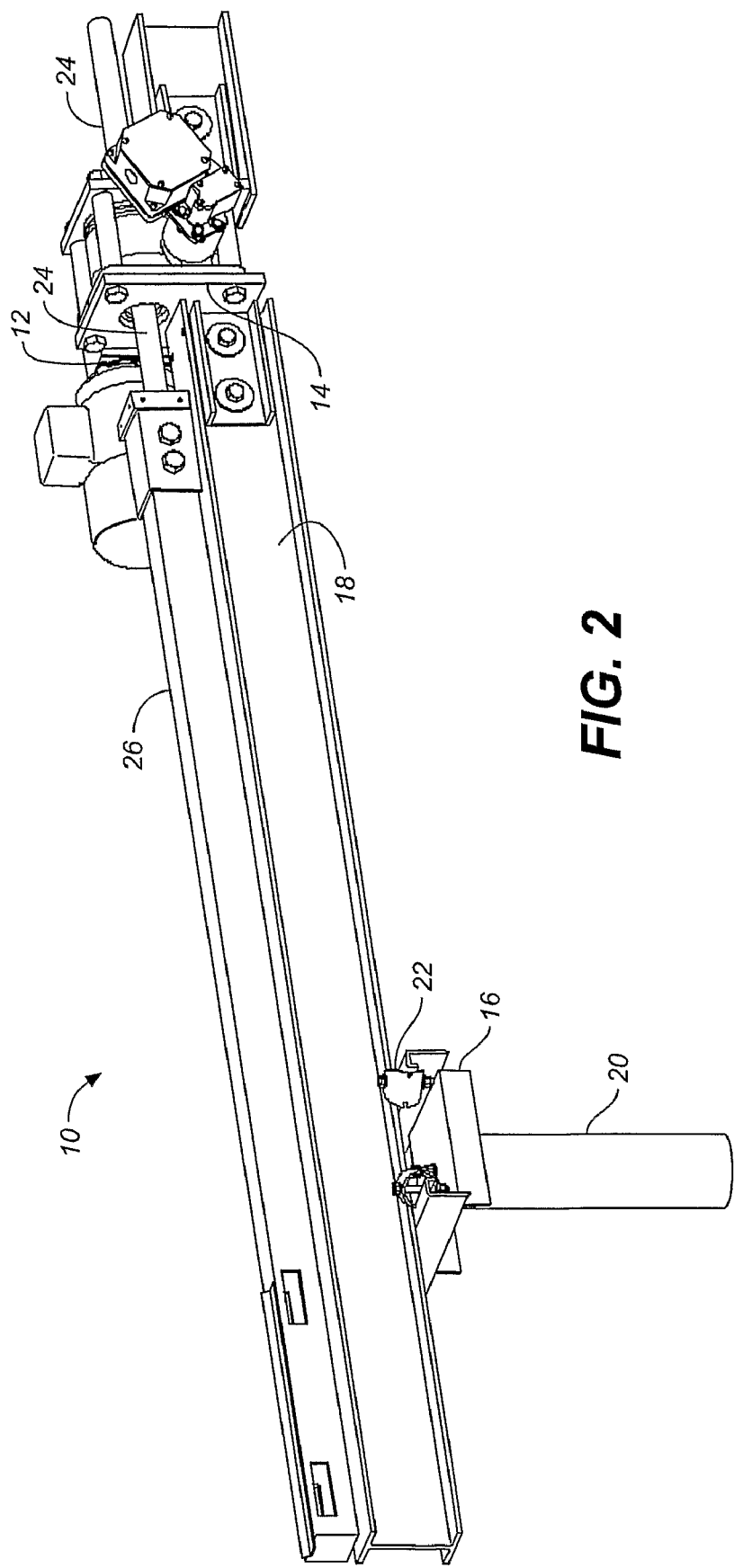
FIG. 2 is a drawing of the drive actuator illustrating how it transmits linear force to the rotational actuators in each row.

FIG. 2 shows a preferred drive system 10 for the solar panel array tracking system of the present invention. The drive system includes one or more motorized rams 12, each mounted to a ram support 14 which is in turn mounted to a ram support beam 18, which is disposed substantially horizontally. The ram support beam 18 is typically attached to support bases 16 with clamps 22 or welds, and the support bases are each attached to a piling or post 20 drive into the ground or otherwise securely mounted on a suitable mounting surface, such as a building roof, and preferably disposed substantially vertically. The motorized ram 12 has dual-sided drive shafts 24 that allow it to provide reciprocating force on opposing sides. That is, the motorized ram will simultaneously push the panel array in front of it and pull the panel array behind it, thereby reducing the number of rams needed to drive the solar array. It also reduces by half the maximum shaft force imposed on the shaft if the ram were located at either end of the rows. The drive shafts may be coupled to a reciprocating drive tube 26, but reference to the drive shaft herein contemplates both the shaft driven directly by the motorized ram and any physical extensions thereof, including tubes such as drive tubes.

In this preferred embodiment the drive shaft support beam 18, which can be any form of structural beam or tubing, is connected directly to the base structure of the ram 12. The drive shaft support beam 18 is the principal structure against which forces exerted by the drive shaft are imposed, and because the drive shaft and ram are each mounted to the support beam, external side loads are virtually eliminated. The drive shaft support beam 18 also functions as a wire and conduit support as well as a support for the ram shaft.

Referring now to FIGS. 3 and 4, the rotational drive system 100 includes a ram 12 that reciprocates (pushes or pulls) one or more drive tubes 102 in a horizontal direction from one or both sides of the ram 12. This horizontal movement is parallel to the longitudinal axis of the support beam and is translated into rotational movement by means of a drive arm 103 which pivots about the axis of rotation A for the solar panel array. A pivot support post platform 104 provides the stationary structure on which the pivot support post 105 is affixed and from which the drive arm 103 rotates. The pivot support post platform also transfers the horizontal force imparted to it back to the drive shaft support beam 18 by means of the pivot support post 104. The combination of the pivot support post platform 104, pivot support post 105, and drive shaft support beam 18 creates the reacting structure for transferring the drive shaft force back to the ram. This combination can also consist of a coaxial structure with the drive shaft positioned in the center and a cylindrical or square tube or pipe surrounding the drive shaft. The drive tube 102 (ref. no. 26 in FIG. 2) moves horizontally between the upper and lower stationary components, i.e., the pivot support post platform and post and the drive shaft support beam 18, respectively, by means of a roller bearing 108 mounted to the drive tube 102 by means of a drive pin 107. This reduces frictional resistance. Sliding bearings or linear bearings can be substituted for the roller bearing. As the drive shaft/reciprocating drive tube 102 translates horizontally, it swings or rotates the drive arm 103 by means of the drive pin 107 that extends into a drive arm channel 109. This drive pin 107 is also connected to a roller bearing inside the drive arm 103 that rolls outwardly in the channel towards the end of the drive arm 103 as the drive arm rotates up from its vertical position. This rolling action provides virtually frictionless movement of the drive arm 103 as it is rotated about the solar array axis. Alternatively linear bearings or sliding bushings can be used in the drive arm 103 for this invention. Rotational support tubes 110 affixed to the underside of the solar panels are mounted in tubular clamps 111 disposed on the shoulders of a mounting rail support bracket 112 on each side of the drive arm 103. The rotational motion of the drive arm 103 is thus transferred directly to the solar array.

Referring now to FIG. 5, in the preferred embodiment of the solar panel array sun tracking system of the present invention, the lateral mounting structure 200 of the solar panel array allows a group of modules or side-by-side panels 202 to be deployed to each side of a support beam, generally with pairs of side-by-side panels mounted in series in an end-to-end fashion. Because of the lengths of the panels and their support structures, and because the panels are rotated and adjusted in coordination, substantial support structure is required, and in the preferred embodiment this comprises two or more panel mounting rails 204 (ref. no. 110 in FIG. 3), shown herein as substantially square tubes. Other support structure can be provided, including rectangular tubes, round tubes, pipe, I-beams, and channels. The mounting rails 204 are affixed to plurality of support cradles 208 which are attached to support posts 206 anchored into the ground at a nominal spacing of 12 to 17 feet. The distance between support posts can be varied over a wider range if the panel mounting rails sized accordingly. The panel mounting rails 204 are pivotally mounted to the support posts 206 (09 in FIG. 1) by means of a support cradle 208 and splice clamps 212 that clamp the mounting rails to the support cradle 208. The support cradle 208 is hinged at the support posts by means of a pivot pin 210 that aligned with the solar panel axis of rotation A.

Referring now to FIG. 6, the support beams of the present invention are preferably provided with a novel vertical adjustment mechanism 300. This mechanism is disposed within and located at each of the support posts to provide for independent and easy vertical adjustability of each post. The mechanism comprises a tube pair 302 with a shared angular seam and a cinch plate 304, both of which are inserted into the support post tube 310. A pivot bracket 306 is mounted on top. Once the tube pair 302 is positioned at the appropriate height the cinch bolt or threaded rod 308 is tightened creating an offset within the support post 310 which in turn holds the array at the desired position and provides the vertical support needed for the array.

The solar panel mounting apparatus of the preferred embodiment of the inventive solar panel array sun tracking system is shown in FIG. 7. Each solar panel pair 400 is mounted to two or more cross rails 404 which in turn are mounted to the panel mounting rails 406 (ref. nos. 204 in FIG. 5 and 110 in FIG. 3). This structural sandwich of panels 402, cross rails 404, and panel mounting rails 406 creates the structural rigidity needed to withstand winds exceeding 100 miles per hour. The cross rails 404 are typically notched to provide fast and accurate positioning of the rails on the panel mounting rails 406. The cross rails 404 are clamped to the panel mounting rails 406 (ref. no. 204 in FIG. 5) with pairs of anchor clamps 412 that are cinched together by means of standard nuts and bolts. Each solar panel 402 is connected to the cross rails 404 with industry standard T Clips and End Clips 408 and 410. There are two or more cross rails 404 that hold each panel pair 400 and provide a 4 point contact to insure proper support. FIG. 7 illustrates the typical attachment method for T Clips and End Clips 408 and 410 to the panel 402.

Having fully described several embodiments of the present invention, many other equivalents and alternative embodiments will be apparent to those skilled in the art. These and other equivalents and alternatives are intended to be included within the scope of the present invention.

The invention claimed is:

1. A solar panel array sun tracking system, comprising:
a plurality of support posts disposed on a mounting surface;
at least one drive shaft support beam mounted onto said support posts in a generally horizontal orientation, each of said at least one drive shaft support beam having a longitudinal axis corresponding to said horizontal orientation;
a plurality of pivot support post platforms fixedly attached to each of said at least one drive shaft support beam;
pivot structure connected to each of said pivot post platforms, each pivot structure including an array axis of rotation disposed generally horizontally and generally perpendicular to said longitudinal axis of said drive shaft support beam;
lateral mounting structure for supporting a plurality of solar panels on each side of said drive shaft support beam;
a plurality of panel mounting structures for mounting a plurality of substantially co-planar solar panels, said panel mounting structure pivotally attached to said pivot structure at said array axis of rotation, said panel mounting structure pivotally attached to said lateral mounting structure;
a rotational drive system having at least one drive shaft operatively connected to said pivot structure and disposed parallel to said drive shaft support beam and further having motorized means for imparting a reciprocating force to said at least one drive shaft; and
at least one reciprocating drive tube axially connected to each of said drive shafts and
interposed between said drive shaft and said pivot structure;
wherein when said rotational drive system is operated, each of said at least one drive shaft causes a plurality of said panel mounting structures to pivot about the respective array axis of rotation of the pivot structure to which the particular panel mounting structure is pivotally connected.

2. The system of claim 1, wherein said rotational drive system is a motorized ram having two drive shafts disposed on opposing sides of said motorized ram, the reciprocating force imparted by said motorized ram including a pulling force on one side and a simultaneous pushing force on the other side.

3. The system of claim 2, wherein said motorized ram is mounted to a ram support, which is mounted to said drive shaft support beam.

4. The system of claim 1, wherein said drive shaft support beam is attached to said support posts with a support base.

5. The system of claim 1, wherein said pivot structure comprises a pivot support post disposed upwardly from said pivot support post platform, a drive arm pivotally attached to said pivot support post at said array axis of rotation and pivotally attached to said reciprocating drive tube, and a mounting rail support bracket.

6. The system of claim 1, wherein said pivot structure comprises a pivot support post disposed upwardly from said pivot support post platform, a drive arm pivotally attached to said pivot support post at said array axis of rotation and pivotally attached to said drive shaft, and a mounting rail support bracket.

7. The system of claim 6, wherein said drive shaft support beam and said pivot post platform are stationary structures and said drive shaft moves between said drive shaft support beam and said pivot support post platform.

8. The system of claim 7, wherein said drive arm includes a channel and said drive shaft is pivotally connected to said drive arm by a roller bearing connected to said drive shaft and rollingly disposed within the channel in said drive arm with a drive pin, and wherein said roller bearing rolls outwardly in the channel in said drive arm as the drive arm rotates up from a vertical position.

9. The system of claim 1, wherein said panel mounting structure comprises panel mounting rails affixed to said pivot structure and said lateral mounting structure.

10. The system of claim 9, wherein said pivot structure comprises a pivot support post disposed upwardly from said pivot support post platform, a drive arm pivotally attached to said pivot support post at said array axis of rotation and pivotally attached to said drive shaft, and wherein said panel mounting rails are connected to a mounting rail support bracket with tubular clamps.

11. The system of claim 9, wherein said lateral mounting structure comprises:
a plurality of support posts anchored on a surface;
a plurality of support cradles each pivotally attached to one of said support posts with a pivot pin aligned with said array axis of rotation.

12. The system of claim 1, wherein said support beams include vertical adjustment means.

13. The system of claim 12, wherein said vertical adjustment means comprises a support post tube, an upper tube member and lower tube member, said tube members being inserted into said tube and having a shared angular seam, a cinch plate, and a threaded cinch bolt disposed through said tube members, such that when said cinch bolt is tightened an offset between said upper tube member and said lower tube member is created within said support post which holds said tube members at a desired position.

14. The system of claim 13, further including a pivot bracket mounted on said upper tube member.

15. The system of claim 1, wherein said panel mounting structure includes panel mounting rails and at least two cross rails clamped to said panel mounting rails.

* * * * *